J. J. SNIGO.
ANTISKIDDING DEVICE FOR PNEUMATIC TIRES.
APPLICATION FILED FEB. 2, 1916.
1,216,870.
Patented Feb. 20, 1917.
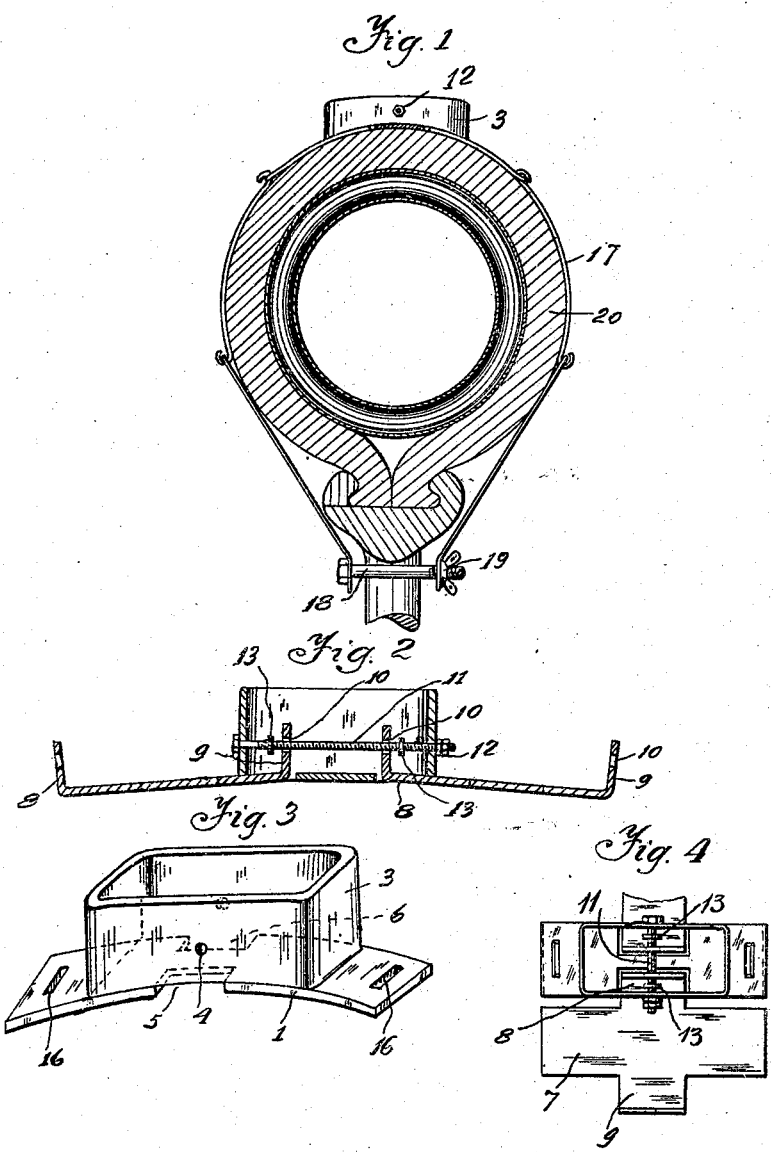

UNITED STATES PATENT OFFICE.

JAMES J. SNIGO, OF PITTSBURGH, PENNSYLVANIA.

ANTISKIDDING DEVICE FOR PNEUMATIC TIRES.

1,216,870. Specification of Letters Patent. Patented Feb. 20, 1917.

Application filed February 2, 1916. Serial No. 75,647.

*To all whom it may concern:*

Be it known that I, JAMES J. SNIGO, a citizen of the United States, residing at Pittsburgh, in the county of Allegheny and State of Pennsylvania, have invented certain new and useful Improvements in an Antiskidding Device for Pneumatic Tires, of which the following is a specification.

This invention relates to an anti-skidding device for pneumatic tires and has for its object to provide a device of such type, in a manner as hereinafter set forth, for reducing skidding or slewing to a minimum when traveling upon smooth or slippery road surfaces and to further provide an anti-skidding device for pneumatic tires having means in a manner as hereinafter set forth to overcome the puncturing of the tread of the tire by sharp objects, glass, nails, etc., upon the road surface.

Further objects of the invention are to provide an anti-skidding device for tires which is simple in its construction and arrangement, strong, durable, conveniently applied to the tire, efficient in its use and inexpensive to manufacture.

With the foregoing and other objects in view the invention consists of the novel construction, combination and arrangement of parts as hereinafter more specifically described and illustrated in the accompanying drawing, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a vertical transverse sectional view of a tire showing the adaptation therewith of an anti-skidding device in accordance with this invention.

Fig. 2 is a detail in longitudinal section.

Fig. 3 is a perspective view of one of the anti-skidding members.

Fig. 4 is a top plan view, broken away, of the anti-skidding device.

An anti-skidding device in accordance with this invention consists of an annulus formed of a set or series of anti-skidding members, a set or series of coupling members, and a plurality of adjusting members. The coupling members are employed for connecting the anti-skidding members together and the adjusting members are used for securing the device in position upon the tread of a wheel. The coupling members are alternately disposed with respect to the anti-skidding members.

Each of the anti-skidding members consists of a plate 1 which is rectangular in plan and curvilinear in elevation and formed integral with the upper face of the plate 1 is an anti-skidding element 3 preferably rectangular in plan and formed of side and end walls. The side walls are flush with the side edges of the plate 1 and the end walls are spaced inwardly with respect to the ends of said plate 1. Each of the side walls is formed with an opening 4. The plate 1, centrally of its longitudinal marginal portions, is cut away to provide a pair of openings 5, 6, whereby the bottom of each of the elements 3 will be formed with a pair of openings and these latter are rectangular in contour.

Each of the coupling members consists of a plate 7, rectangular in plan and curvilinear in elevation and projecting from each longitudinal edge of the plate 7 is an L-shaped wing and the said wings are indicated at 8, 9. The vertical legs of each of said wings is formed with an opening 10 which is larger than the opening 4 and said openings 10 are positioned in the wings so as to be in alinement with the opening 4 in the anti-skidding elements 3.

When the anti-skidding members are positioned with respect to the coupling members the horizontal legs of the wings 8, 9, extend under the side walls of the anti-skidding elements and into the openings 5, 6. The vertical legs in the wings extend up into the anti-skidding elements. When they are arranged in this manner the wing 9 of one coupling member 7 opposes the wing 8 of another coupling member. The anti-skidding and coupling members are connected together by removable securing devices which extend through the openings 4 of the anti-skidding elements and through the openings of the vertical legs of the opposed wings 8, 9, of a pair of coupling members. The securing device may consist of elongated cotter pins or by way of example as shown headed bolts 11 provided with nuts 12.

The openings 10 of the L-shaped wings are of a size much larger than the bolt 11 so that the wings will have free movement thereon.

If desired the bolts 11 may be provided with nuts 13, so as to take up any looseness when the annulus is mounted upon the tire 20, the latter being carried by the rim of a wheel.

Certain of the plates of the anti-skidding members are provided near their ends with openings 16 for the reception of straps 17 which are employed, in connection with the bolts 18 and nuts 19 for adjusting the annulus in position.

What I claim is:—

1. An anti-skidding device comprising an annulus formed of a series of anti-skidding members, a series of coupling members, said coupling members alternately disposed with respect to said anti-skidding members, said anti-skidding members provided with hollow anti-skidding elements, said coupling members having L-shaped wings extending into said anti-skidding elements, and means extending through said elements and wings for detachably connecting said anti-skidding and coupling members together.

2. An anti-skidding device comprising an annulus formed of a series of anti-skidding members, a series of coupling members, said coupling members alternately disposed with respect to said anti-skidding members, said anti-skidding members provided with hollow anti-skidding elements, said coupling members having L-shaped wings extending into said anti-skidding elements, and means extending through said elements and wings for detachably connecting said anti-skidding and coupling members together, and means connected to certain of said anti-skidding members for attaching the annulus upon the tread of a wheel.

3. An anti-skidding device for tires comprising an annulus consisting of a series of anti-skidding members provided with anti-skidding elements and further having openings in the bottom thereof, a series of coupling members alternately disposed with respect to said anti-skidding members and each provided with a pair of oppositely disposed L-shaped wings extending into opposed anti-skidding elements, and means extending through said wings and anti-skidding elements for detachably connecting the anti-skidding members and coupling members together.

4. An anti-skidding device for tires comprising an annulus consisting of a series of anti-skidding members provided with anti-skidding elements and further having openings in the bottom thereof, a series of coupling members alternately disposed with respect to said anti-skidding members and each provided with a pair of oppositely disposed L-shaped wings extending into opposed anti-skidding elements, and means extending through said wings and anti-skidding elements for detachably connecting the anti-skidding members and coupling members together, and means for attaching said annulus upon a tire.

5. An anti-skidding device for tires comprising an annulus formed of anti-skidding members and coupling members, the coupling members being alternately disposed with respect to the anti-skidding members, said anti-skidding members having anti-skidding elements, said coupling members having wings extending up into the anti-skidding elements, and means for connecting said wings and anti-skidding elements together.

6. An anti-skidding device for tires comprising an annulus formed of anti-skidding members and coupling members, the coupling members being alternately disposed with respect to the anti-skidding members, said anti-skidding members having anti-skidding elements, said coupling members having wings extending up into the anti-skidding elements, and means for connecting said wings and anti-skidding elements together, said wings being loosely mounted upon said means.

7. An anti-skidding device for tires comprising an annulus formed of anti-skidding members and coupling members, the coupling members being alternately disposed with respect to the anti-skidding members, said anti-skidding members having anti-skidding elements, said coupling members having wings extending up into the anti-skidding elements, and means for connecting said wings and anti-skidding elements together, said wings being loosely mounted upon said means, and means for attaching said annulus in position upon a tread of a tire.

In testimony whereof I affix my signature in the presence of two witnesses.

JAMES J. SNIGO.

Witnesses:
NICHOLAS L. BOGAN,
LUELLA H. SIMON.